(12) United States Patent
Dong et al.

(10) Patent No.: US 11,093,542 B2
(45) Date of Patent: Aug. 17, 2021

(54) MULTIMEDIA OBJECT SEARCH

(71) Applicant: INTERNATIONAL BUSINESS MACHINES CORPORATION, Armonk, NY (US)

(72) Inventors: Wei Ting Dong, Shanghai (CN); Shi Kun Li, Shanghai (CN); Ying Li, Shanghai (CN); Su Liu, Austin, TX (US); Jun Qian Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 15/717,981

(22) Filed: Sep. 28, 2017

(65) Prior Publication Data

US 2019/0095445 A1 Mar. 28, 2019

(51) Int. Cl.
*G06F 16/432* (2019.01)
*G06F 16/632* (2019.01)
*G06F 16/732* (2019.01)

(52) U.S. Cl.
CPC .......... *G06F 16/434* (2019.01); *G06F 16/433* (2019.01); *G06F 16/632* (2019.01); *G06F 16/7335* (2019.01)

(58) Field of Classification Search
CPC .......... G06F 16/40; G06F 16/41; G06F 16/43; G06F 16/432; G06F 16/434; G06F 16/60; G06F 16/61; G06F 16/63; G06F 16/632; G06F 16/68; G06F 16/685; G06F 16/638; G06F 16/64; G06F 16/65; G06F 16/683; G06F 16/447; G06F 16/48; G06F 16/483; G06F 16/487; G06F 16/489; G06F 16/687; G06F 16/686; G06F 16/71; G06F 16/73;

(Continued)

(56) References Cited

U.S. PATENT DOCUMENTS 5,317,650 A * 5/1994 Harrington ........... G06T 11/203
345/442
6,201,176 B1 * 3/2001 Yourlo .................. G06F 16/683
84/609

(Continued)

OTHER PUBLICATIONS

Knees et al., "Searching for Audio by Sketching Metnal Images of Sound", ICMR Jun. 6-9, 2016.(Year: 2016).*

(Continued)

*Primary Examiner* — David T. Brooks
(74) *Attorney, Agent, or Firm* — Dmitry Paskalov

(57) ABSTRACT

Implementations of the present disclosure relate to methods, systems, and computer program products for multimedia object management. In one implementation, a computer-implemented method is disclosed and the method may be implemented by one or more processors in a computer. In the method, a graphic pattern indicating a request for searching in a repository for at least one target object may be received. A search condition may be obtained from the received graphic pattern by a graphical analysis. Based on an association model indicating associations between the search condition and at least one feature of one or more objects in the repository, at least one target object may be found according to the obtained search condition. In other implementations, a computer-implemented system and a computer program product for searching for at least one target object is disclosed.

17 Claims, 6 Drawing Sheets

(58) Field of Classification Search
CPC .... G06F 16/732; G06F 16/7335; G06F 16/78; G06F 16/783; G06F 16/7834; G06F 16/7867; G06F 16/787; G10H 2210/066; G10H 2210/091
See application file for complete search history.

(56) References Cited

U.S. PATENT DOCUMENTS

| | | | | |
|---|---|---|---|---|
| 6,245,984 | B1* | 6/2001 | Aoki | G10H 1/0025 84/611 |
| 6,411,724 | B1* | 6/2002 | Vaithilingam | G06F 16/48 382/100 |
| 6,528,715 | B1* | 3/2003 | Gargi | G10H 1/0033 84/615 |
| 8,344,233 | B2 | 1/2013 | Cai et al. | |
| 8,489,606 | B2 | 7/2013 | Lee et al. | |
| 9,507,805 | B1 | 11/2016 | Chechik | |
| 2003/0159567 | A1* | 8/2003 | Subotnick | G06F 3/04883 84/626 |
| 2005/0281467 | A1* | 12/2005 | Stahovich | G06K 9/00416 382/202 |
| 2007/0044639 | A1* | 3/2007 | Farbood | G10H 1/0025 84/609 |
| 2007/0292832 | A1* | 12/2007 | Doyle | G09B 5/06 434/308 |
| 2009/0228799 | A1* | 9/2009 | Verbeeck | G06F 16/685 715/727 |
| 2009/0307629 | A1* | 12/2009 | Horiuchi | G06F 3/04817 715/810 |
| 2010/0229124 | A1* | 9/2010 | Green | G06F 3/0482 715/828 |
| 2011/0035705 | A1* | 2/2011 | Faenger | G06F 16/4387 715/811 |
| 2012/0054177 | A1* | 3/2012 | Wang | G06F 16/5854 707/723 |
| 2012/0250934 | A1 | 10/2012 | Shiraishi | |
| 2012/0271847 | A1 | 10/2012 | Watanabe et al. | |
| 2014/0052731 | A1* | 2/2014 | Dahule | G11B 27/034 707/740 |
| 2014/0164998 | A1* | 6/2014 | Jadhav | G11B 27/034 715/810 |
| 2014/0325408 | A1* | 10/2014 | Leppanen | G06F 3/0481 715/765 |
| 2015/0052435 | A1* | 2/2015 | DeMers | G06F 16/632 715/716 |
| 2015/0058733 | A1* | 2/2015 | Novikoff | G11B 27/038 715/723 |
| 2016/0292410 | A1* | 10/2016 | Lu | G06F 21/36 |

OTHER PUBLICATIONS

Batterman et al., "SonoSketch: Querying Sound Effect Databases through Painting", Audio Engineering Society 126th COnvention, May 7-20, 2009, Munich, Germany. (Year: 2009).*

Farbood et al., "Composing with Hyperscore: An Intuitive Interface for Visualizing Musical Structure", International Computer Music Conference, ICMC 2007 (Year: 2007).*

Tsiros, A., "A Multidimensional Sketching Interface for Visual Interaction with Corpus-Based Concatenative Sound Synthesis." (Thesis). Edinburgh Napier University. Feb. 29, 2016. (Year: 2016).*

Pierre Couprie. Graphical representation: an analytical and publication tool for electroacoustic music. Organised Sound, Cambridge University Press (CUP), 2004, 9 (1), pp. 109-113. (Year: 2004).*

Mell et al., "The NIST Definition of Cloud Computing", National Institute of Standards and Technology, U.S. Department of Commerce, Special Publication 800-145, Sep. 2011, pp. 1-7.

* cited by examiner

MULTIMEDIA OBJECT SEARCH

BACKGROUND

The present disclosure generally relates to multimedia management. Specifically, the present disclosure relates to methods, systems and products for searching for at least one multimedia object in a repository.

Nowadays, there are a variety of multimedia playback applications. Users of these applications may search for a desired song in an online/local repository by inputting a song name, a singer, or an album name. Sometimes, the user does not have a clear target and may just want to listen to, for example, a fast song. At this point, how to find the desired song(s) in a flexible and convenient way becomes a focus.

SUMMARY

In one aspect, a computer-implemented method is disclosed. The method may be implemented by one or more processors in a computer. According to the method, a graphic pattern indicating a request for searching in a repository for at least one target object may be received. A search condition may be obtained from the received graphic pattern by a graphical analysis. Based on an association model indicating associations between the search condition and at least one feature of one or more objects in the repository, at least one target object may be found according to the obtained search condition.

In another aspect, a computer-implemented system is disclosed. The computing system comprises a computer processor coupled to a computer-readable memory unit, where the computer-readable memory unit comprises instructions that when executed by the computer processor implements a method. According to the method, a graphic pattern indicating a request for searching in a repository for at least one target object may be received. A search condition may be obtained from the received graphic pattern by a graphical analysis. Based on an association model indicating associations between the search condition and at least one feature of one or more objects in the repository, at least one target object may be found according to the obtained search condition.

In another aspect, a computer program product is disclosed. The computer program product comprises a computer readable storage medium having program instructions embodied therewith. The program instructions are executable by an electronic device to cause the electronic device to perform actions of: receiving a graphic pattern indicating a request for searching in a repository for at least one target object; obtaining a search condition from the received graphic pattern by a graphical analysis; and searching, based on an association model, for the at least one target object according to the obtained search condition, the association model indicating associations between the search condition and at least one feature of one or more objects in the repository.

It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
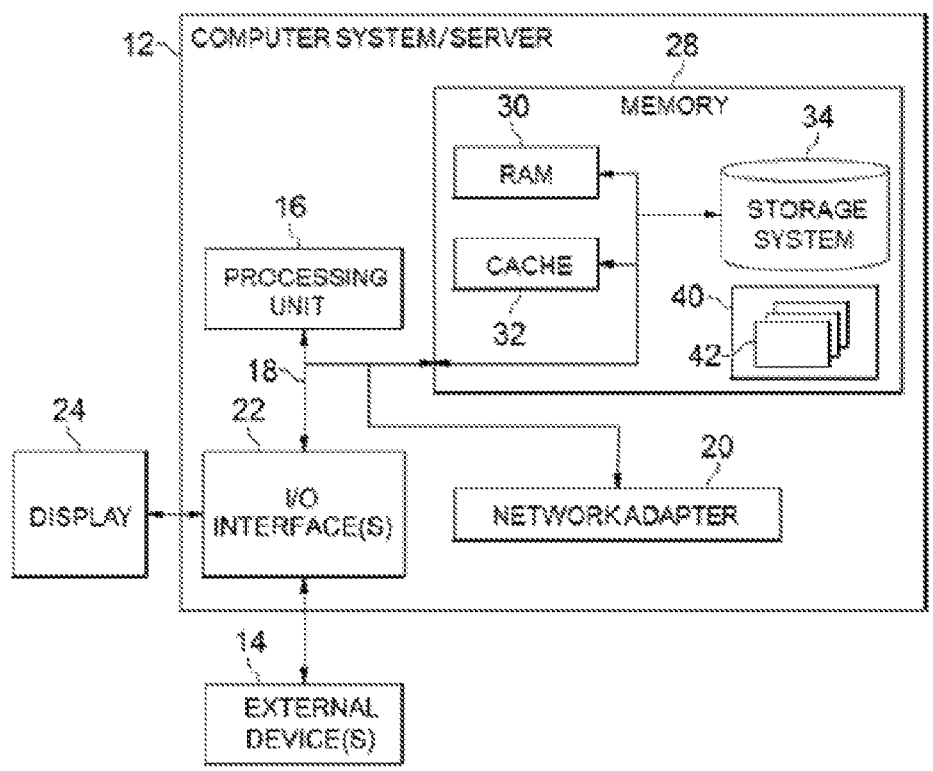
FIG. 1 depicts a cloud computing node, according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
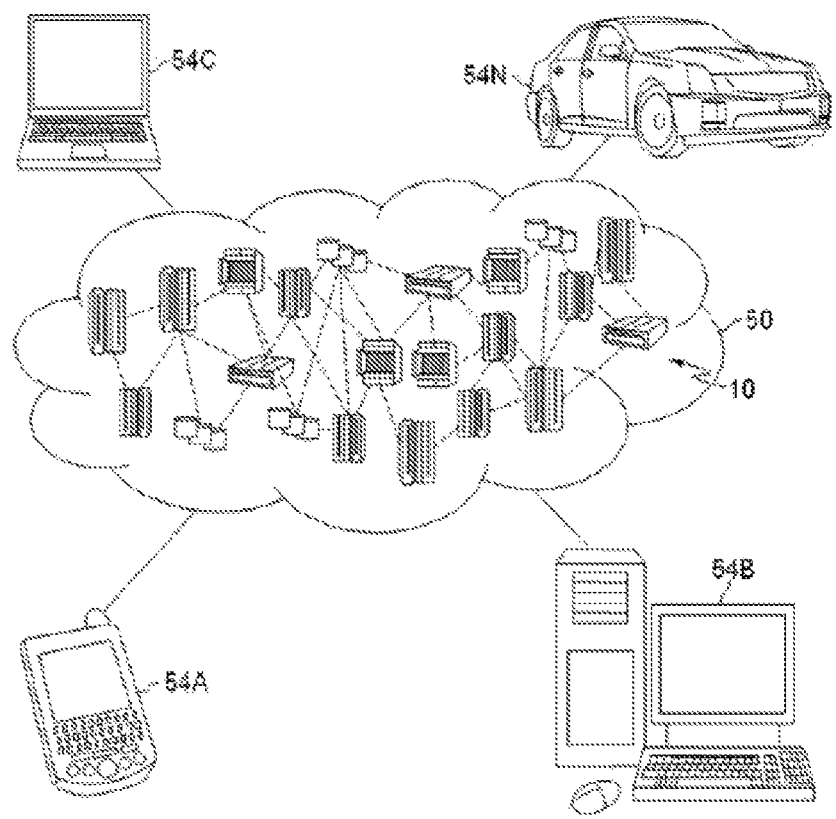
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
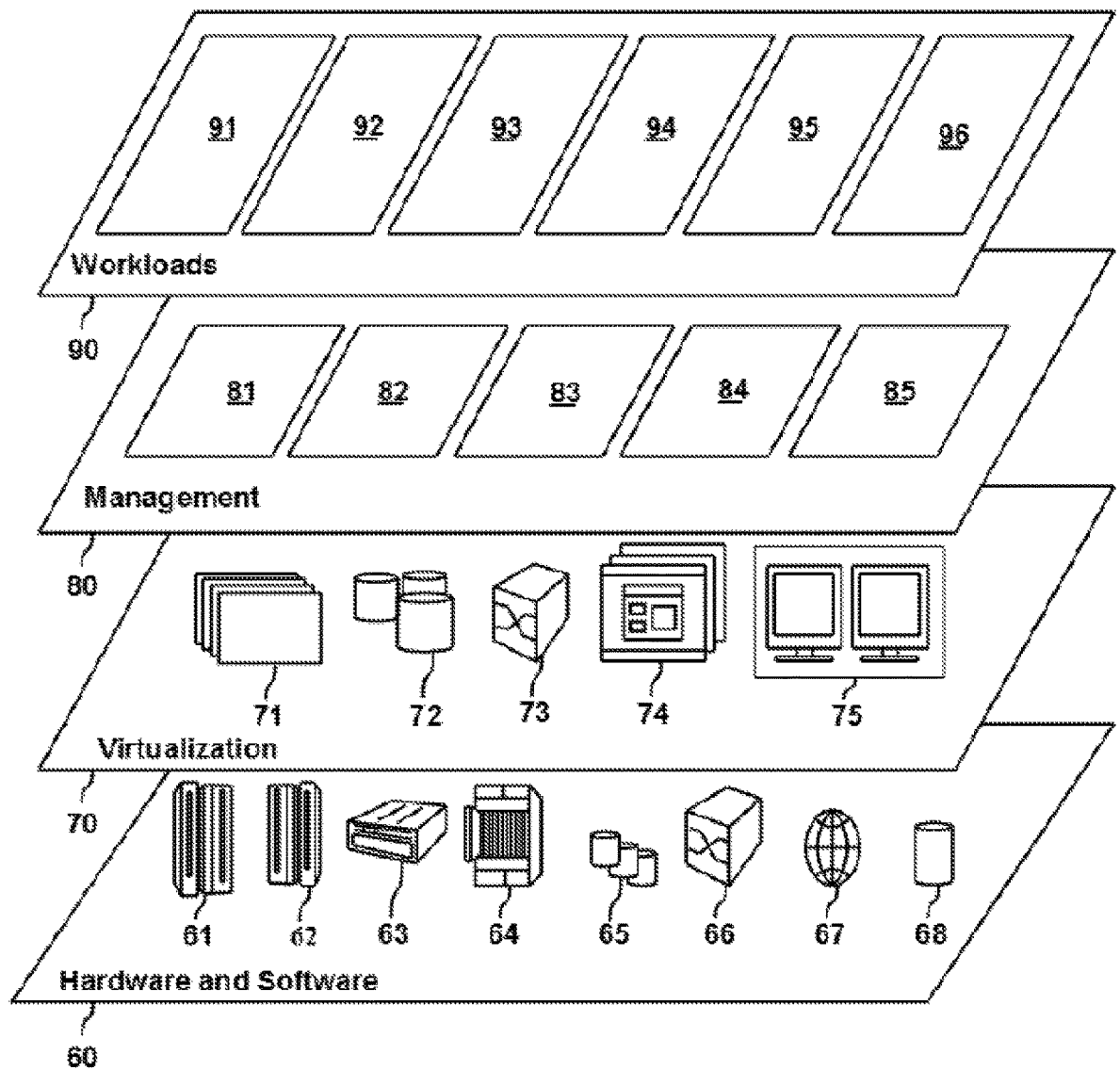
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and search processing 96. Hereinafter, reference will be made to FIGS. 4 to 14 to describe details of the search processing 96.

There have been provided approaches in the field of multimedia management. For the sake of description, implementations of the present disclosure will be described by taking an audio song database as an example of a multimedia object repository. In the context of the present disclosure, the multimedia object may be a song/music in forms of audio files or video files, as long as the multimedia object has features such as at least one of a rhythm, a pitch, a sound range, a duration, and the like. According to a traditional solution, in order to search for a desired song, the user is required to input details of the song (such as the name of the song, the singer of the song, and the like) as keywords. In some multimedia object repositories, the songs are classified as pop music, jazz, rock and roll, and the like according to their styles. With the predefined classifications, the user may select song(s) from the provided styles. At this point, the user may find the desired song according to the styles of the songs. However, sometimes the user does not know much information about the desired song. At this point, how to implement the search in a more flexible and convenient way becomes a problem.

Figure 4:
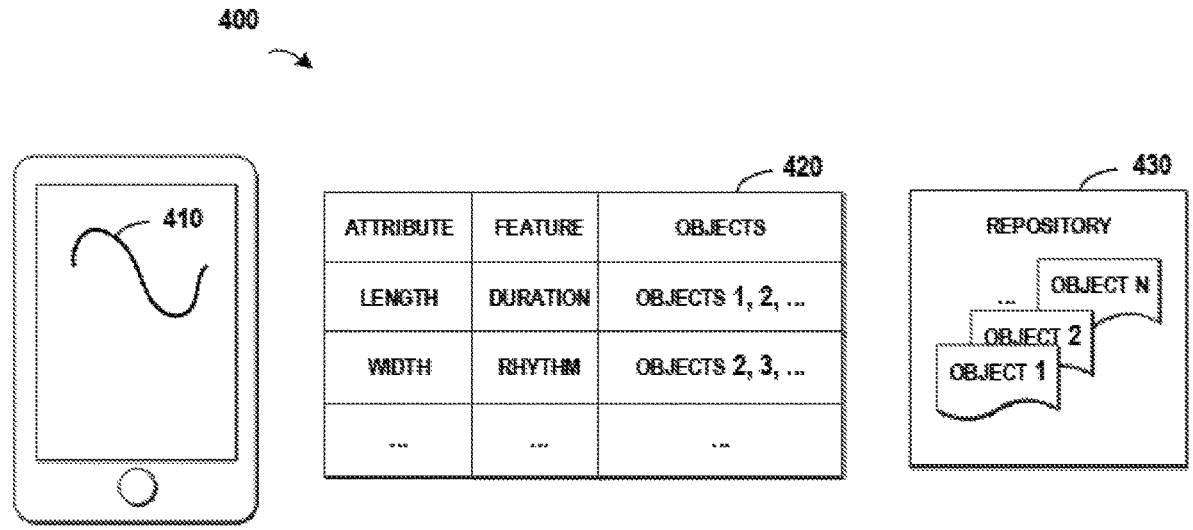
FIG. 4 depicts an example diagram of searching for at least one target object in a repository based on a request indicated by a graphic pattern, according to an embodiment of the present invention.

In order to at least partially solve the above and other potential problems, a new method of searching for at least one target object is disclosed according to implementations of the present disclosure. Hereinafter, reference will be made to FIG. 4 for a general depiction of the present disclosure. FIG. 4 depicts an example diagram 400 of searching for at least one target object in a repository 430 based on a request indicated by a graphic pattern 410, according to one implementation of the present disclosure.

Referring to FIG. 4, the graphic pattern 410 may be inputted by the user via an input device that may track movements of the user input. For example, the user may input the graphic pattern 410 via a touch sensitive screen, a stylus, a mouse, a touch pad, a trackball and so on. In the example of FIG. 4, the user may draw the graphic pattern 410 on a touch sensitive screen of a terminal device such as a smart phone. In this implementation, it does not require the user to know the detailed information such as the name and the singer of the song. Instead, the user may draw the graphic pattern 410 on his/her smart phone as the request for searching for at least one target songs in the repository 430. Further, search condition(s) may be extracted from the graphic pattern 410 for implementing the search in the repository 430.

Although the illustrated graphic pattern 410 includes only one stroke in FIG. 4, in another example, the graphic pattern 410 may include more than one stroke and attributes of the stroke(s) may indicate various aspects of the search conditions. For example, the width of the stroke may be associated with the rhythm of the target object, and the position of the stroke may be associated with the pitch of the target object, and so on.

According to FIG. 4, an association model 420 may be provided in advance for indicating associations between search conditions and features of objects in the repository 430. For example, the association model 420 may define that a small width may be associated with target objects with fast rhythms, and a high position may be associated with target objects with high pitches. At this time, based on the obtained search condition and the association model 420, at least one target object may be found in the repository 420. In one example, if the width of the graphic pattern 410 is small, then fast songs may be found. It is to be understood that the above association model 420 is just an example where the length is associated with the duration and the width is associated with the rhythm. In another implementation, the association model 420 may be defined according the user's preference. For example, the length may be associated with the rhythm and the width may be associated with the gender of the singer.

The above implementation may provide a more flexible and convenient way for target object searching. With this implementation, the user may specify a fuzzy search condition without knowing details of the target object. As one example, if the user is searching for a fast song, he/she may draw a graphic pattern with a small width; if the user is searching for a song with a high pitch, he/she may draw a graphic pattern at a higher position in the screen. After the general descriptions of the implementations in the above paragraphs, hereinafter, reference will be made to FIG. 5 for the detailed searching procedure.

Figure 5:
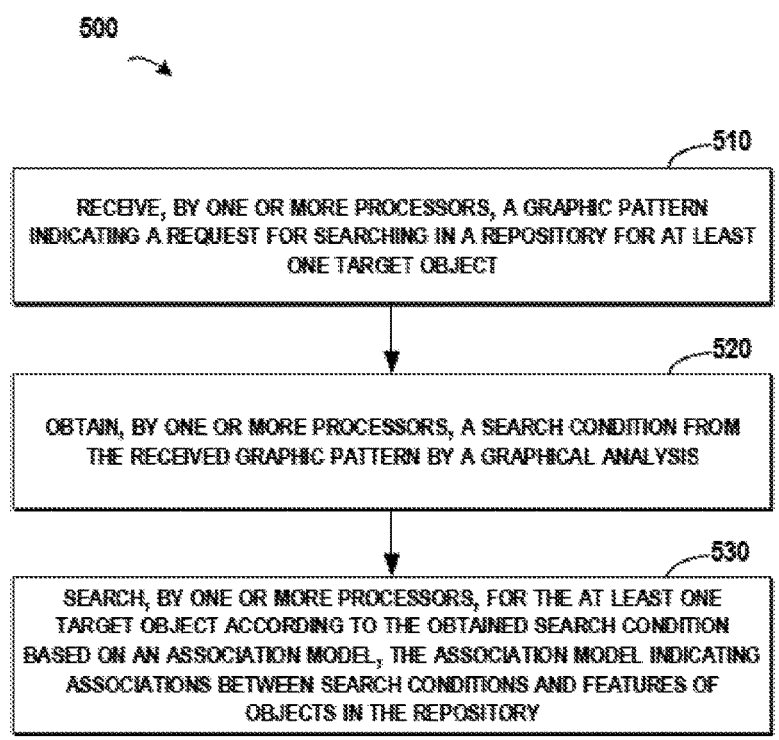
FIG. 5 depicts an example flowchart of a method of searching for at least one target object in a repository based on a request indicated by a graphic pattern, according to an embodiment of the present invention.

FIG. 5 depicts an example flowchart of a method 500 of searching for at least one target object in a repository based on a request indicated by a graphic pattern according to one implementation of the present disclosure. As depicted in FIG. 5, the graphic pattern 410 that indicates a request for searching in the repository 430 for at least one target object may be received 510 from the user. Here, the user may describe features of the desired song(s) with the graphic pattern 430 according to rules defined by the association model 420. The graphic pattern 410 may include one or more strokes, and attributes of the stroke(s) may be associated with features of the target objects.

Based on a graphical analysis to the graphic pattern 410, a search condition may be obtained 520. Here the search condition may be determined from respective attributes associated with respective features of the target objects. For example, the attributes may include a width, a position, an amplitude, a thickness, a line type, a shape, a length, a color of the stroke in the received graphic pattern, a number of at least one stroke in the received graphic pattern, or a combination thereof.

Further, based on the association model 420, at least one target object may be searched 530 according to the obtained search condition, where the association model 420 may indicate associations between search conditions and features of objects in the repository 430. In this implementation, the features of the objects may include at least one of: a rhythm, a pitch, a sound range, background music, a classification, a language, a duration, a gender of an artist of the target object, and a type of an artist of the target object. Here, the association model 420 may define one-one association relationship, where one attribute may be associated with one feature.

In one implementation of the present application, the graphic pattern 410 may include at least one stroke. At this point, with respect to one stroke, at least one attribute of the stroke may be extracted by the graphical analysis, and then the search condition may be determined based on at least one attribute. Here, the attribute may include several aspects related to the stroke, such as a width, a position, an amplitude, a thickness, a line type, a shape, a length, and a color of the stroke in the received graphic pattern. In another example, the number of the strokes included in the graphic pattern 410 may be considered as an attribute.

It is to be understood that, the association model 420 may be defined according one or more attributes of the stroke, and one of the attributes may be associated with any one from the features of the objects. Reference will be made to FIGS. 6 to 13 for details of the association relationships between the attributes of the stroke and the features of the objects.

Figure 6:
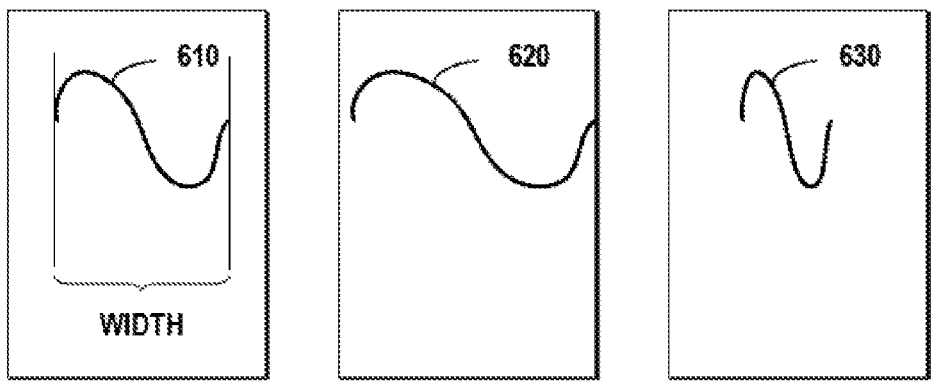
FIGS. 6-13 depict respective example graphic patterns indicating respective requests, according to respective embodiments of the present invention.

FIG. 6 depicts respective example graphic patterns that include respective strokes with different widths according to one implementation of the present disclosure. Three graphic patterns 610, 620, and 630 are depicted in FIG. 6, where each of these graphic patterns 610, 620, and 630 includes one stroke with a corresponding width. Referring to FIG. 6, the width of the stroke may refer to a horizontal distance of the stroke, and various methods may be utilized for measuring the width. According to one method, the width may be represented by the number of the pixels crossed by the stroke in the horizontal direction of the touch sensitive screen. According to another method, the width may be represented by a percentage of the above pixel number to the horizontal resolution of the touch sensitive screen. In the latter method, the width may be normalized to a range from 0 to 100. In one implementation, if the graphic pattern 410 is of a wave shape, then the wavelength of the graphic pattern 410 may be considered as the width.

Although the graphic patterns in FIG. 6 include strokes of wave shapes, in another example, the stroke may be at least one of a wave shape, a line, a triangle, a rectangle, a square, a circle, and a random shape. According to one implementation of the present application, the association model 420 may specify the association relationship between the width of the stroke and at least one of the following features of the target objects: a rhythm, a pitch, a sound range, background music, a classification, a language, a duration, a gender of an artist of the target object, and a type of an artist of the target object.

Having provided the general description of the association model 420 in the above paragraphs, detailed definitions will be presented hereinafter with reference to Table 1. Here, Table 1 shows an example association model 420, which specifies that the width of the stroke may be associated with the rhythm of the song.

TABLE 1

Example Association Model

| No. | Attribute | Feature | Objects |
|---|---|---|---|
| 1 | Width: [0, 40] | Rhythm: Fast | Objects 1, 2, 3, . . . |
| 2 | Width: (40, 70] | Rhythm: Medium | Objects 101, 102, 103 . . . |
| 3 | Width: (70, 100] | Rhythm: Slow | Objects 201, 202, 203 . . . |

According to Table 1, a greater width may be associated with the songs with relative slow rhythms, and a smaller width may be associated with the songs having relative fast rhythms. Here, the width may be represented by percentages, and the rhythm may be evaluated by for example words in the lyrics of the object. Alternatively, beats of rhythm of the background music may be utilized for determining the rhythm.

In the above Table 1, the first column "No." may indicate an identifier for each entry in the table, the second column "Attribute" may indicate an attribute of a stroke in the graphic pattern 410 (here, Table 1 shows the width of the stroke), the third column "Feature" may indicate a feature of the object (here, Table 1 shows the rhythm), and the last column "Object" indicate objects with the feature in the third column that are included in the repository 430. Taking the first entry as an example, it may indicate that the width in the range of [0, 40] is associated with objects 1, 2, 3, . . . that have fast rhythms. Referring to FIG. 6, the width of the graphic pattern 620 is the greatest one, the width of the graphic pattern 630 is the smallest one, and the width of the graphic pattern 610 is in the middle. Based on the association model of Table 1, objects corresponding to each of the graphic patterns 610, 620, and 630 may be found.

The following paragraphs will describe how to determine the corresponding target objects based on the graphic patterns 610, 620, 630 and the association model as shown in Table 1. In one implementation of the present disclosure, the target object may be retrieved by querying the association model 420 with the at least one attribute that is extracted from the graphic pattern. Referring back to the above Table 1, the widths of the strokes and the rhythms of the objects are associated with each other. If the user inputs a graphic pattern with a width between 0 and 40 (such as the graphic pattern 630), it may indicate that he/she wants to find target objects with fast rhythms. If the user inputs a graphic pattern with a width between 40 and 70 (such as the graphic pattern 610), it may indicate that he/she wants to find target objects with medium rhythms. Based on the values of the width of the inputted graphic pattern 410 and the above Table 1, the target objects may be retrieved.

In one implementation of the present disclosure, an object may be determined from the association model 420 in response to a feature of the determined object being associated with one of the at least one attribute. Then, the determined object may be returned to the user. Continuing the above example, when the user inputs the graphic pattern 630 indicating that he/she is looking for fast rhythm music, based on the first entry in the above Table 1, Objects 1, 2, 3, . . . that have fast rhythms may be found. Similarly, if the user inputs the graphic pattern 610 which is in the range of [40, 70], it may indicate that he/she is looking for medium rhythm music and then the objects 101, 102, 103, . . . may be found based on the second entry in Table 1. Further, with respect to the graphic pattern 620 which is in the range of (70, 100], the objects 201, 202, 203, . . . may be found.

It is to be understood that the above Table 1 is just an example association model specifying that the width of the stroke is associated with the rhythm of the object. In another implementation, the width may be associated with another feature such as the time duration of the object. At this point, the association model 420 may be represented by Table 2. Similar as Table 1, the width in Table 2 is also represented by percentages, and the duration may be evaluated by the time duration of the object in minutes or in seconds. The association model 420 may specify that the greater the width is, the longer the duration is. Alternatively, the duration may be inversely proportional to the width. At this point, the greater the width is, the shorter the duration is. Based on Table 2, if the width of the stroke is lower than 40, then objects 1, 3, 5, . . . that are shorter than 3 minutes may be found.

TABLE 2

Example Association Model

| No. | Attribute | Feature: | Objects |
|---|---|---|---|
| 1 | Width: [0, 40] | Duration: Short (0-3 minutes): | Objects 1, 3, 5 . . . |
| 2 | Width: (40, 70] | Duration: Medium (3-4 minutes) | Objects 101, 103, 105 . . . |
| 3 | . . . | . . . | |

Although the above Tables 1 and 2 illustrate examples where the association models are based on discrete intervals, in another example, the association models may be represented by a continuous function as below:

$$\text{Duration}(\text{width}) = \frac{\text{width}}{100} * \text{width}_{max} \qquad \text{Formula 1}$$

In Formula 1, where width represents the value of the width in percentage, Duration(width) represents time durations of objects associated with the width, and $\text{width}_{max}$ represents a maximum of the time duration of the objects (here, $\text{width}_{max}$ may be predefined according to the time duration of the objects in the repository 430). Supposing the $\text{width}_{max}$ is defined as 5 minutes and the width of the graphic pattern 610 is 65, the duration may be determined as Duration (65)=65/100*5=3.25 minutes. Accordingly, the objects with the durations of 3.25 may be found.

Alternatively, the width may be mapped to a range of duration. For example, a range from Duration(width)−0.1 to Duration(width)+0.1 may be determined. Continuing the above example, objects with the durations between 3.15 and 3.35 minutes may be determined from the above formula. Further, as the durations of the objects are already known, the objects with durations between 3.15 and 3.35 minutes may be easily retrieved from the repository 430 and returned to the user.

Figure 7:
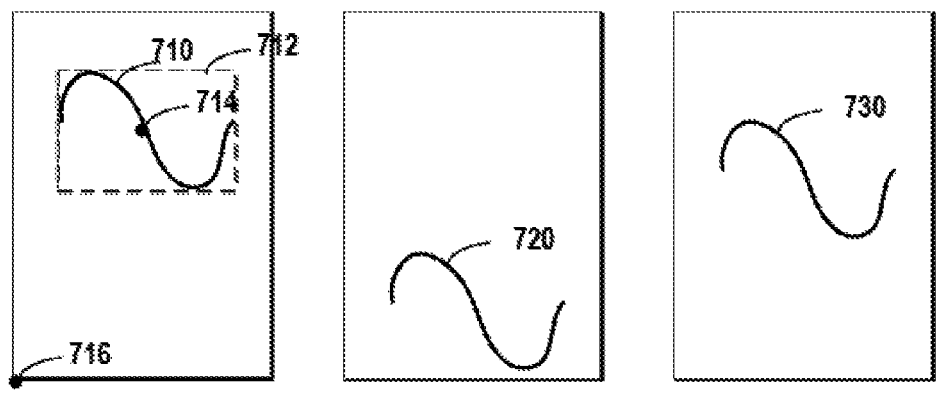

Hereinafter, reference will be made to FIG. 7, which depicts respective example graphic patterns that include respective strokes with different positions according to one implementation of the present disclosure. Three graphic patterns 710, 720, and 730 are depicted in FIG. 7, where each of these graphic patterns 710, 720, and 730 includes one stroke with a corresponding position. Here, the position of the stroke may refer to a vertical offset of the stroke from one corner of the screen, and various methods may be utilized for measuring the position. According to one method, the position may be represented by a vertical offset for a center 714 of a bounding box 712 of the graphic pattern 710. Here, when the center 714 is represented by (x, y) in a coordinate system with the left corner 716 as an original point, the vertical value y may be considered as the position. According to another method, the position may be represented by a percentage of the above vertical value y to the vertical resolution of the touch sensitive screen. In the latter method, the position may be normalized to a range from 0 to 100.

Although the graphic patterns in FIG. 7 include strokes of wave shapes, in another example, the stroke may be at least one of a wave shape, a line, a triangle, a rectangle, a square, a circle, and a random shape. According to one implementation of the present application, the association model 420 may specify the association relationship between the position of the stroke and at least one of the following features of the target objects: a rhythm, a pitch, a sound range, background music, a classification, a language, a duration, a gender of an artist of the target object, and a type of an artist of the target object.

Having provided the general description of the association model 420 in the above paragraphs, detailed definitions will be presented hereinafter with reference to Table 3. Here, Table 3 shows an example association model 420, which specifies that the position of the stroke may be associated with the pitch of the music.

TABLE 3

Example Association Model

| No. | Attribute | Feature | Objects |
|---|---|---|---|
| 1 | Position: [0, 40] | Pitch: Low | Objects 2, 4, 6 . . . |
| 2 | Position: (40, 70] | Pitch: Medium | Objects 102, 104, 106 . . . |
| 3 | Position: (70, 100] | Pitch: High | Objects 202, 204, 206 . . . |

According to Table 3, a high position may be associated with the song with relative high pitch, and a low position may be associated with the song having the relative low pitch. Here, the position may be represented by percentages, and the pitch may be evaluated by for example the highest key of the music in the object. Alternatively, an average value of the keys may be utilized for determining the pitch.

In the above Table 3, the first column "No." may indicate an identifier for each entry in the table, the second column "Attribute" may indicate an attribute of a stroke in the graphic pattern 410 (here, Table 3 shows the position of the stroke), the third column "Feature" may indicate a feature of the object (here, Table 3 shows the pitch), and the last column "Object" indicate objects with the feature in the third column that are included in the repository 430. Taking the first entry as an example, it may indicate that the position in the range of [0, 40] is associated with objects 2, 4, 6, . . . that have low pitches. Referring to FIG. 7, the position of the graphic pattern 720 is the lowest one, the position of the graphic pattern 710 is the highest one, and the position of the graphic pattern 730 is in the middle. Based on the association model of Table 3, objects corresponding to each of the graphic patterns 710, 720, and 730 may be found.

The following paragraphs will describe how to determine the corresponding target objects based on the graphic patterns 710, 720, 730 together with the association model shown in Table 3. Referring back to the above Table 3, the position of the strokes and the pitches of the objects are associated with each other. If the user inputs a graphic pattern with a position between 0 and 40 (such as the graphic pattern 720), it may indicate that he/she wants to find target objects with low pitches, and then the objects 2, 4, 6, . . . may be found according to the first entry in Table 3. In another example, if the user inputs a graphic pattern with a position between 40 and 70 (such as the graphic pattern 730), it may indicate that he/she wants to find target objects with medium pitch, and then the objects 102, 104, 106, . . . may be found according to the second entry in Table 3. Based on the values of the position of the inputted graphic patterns 710-730 and the above Table 3, the target objects may be retrieved.

It is to be understood that the above Table 3 is just an example association model specifying that the position of the stroke is associated with the pitch of the object. In another implementation, the position may be associated with a feature selected from a group including a rhythm, a pitch, a sound range, background music, a classification, a language, a duration, a gender of an artist of the target object, and a type of an artist of the target object.

Hereinafter, reference will be made to FIGS. 8 to 12, which depicts respective example graphic patterns relating to the amplitude, a thickness, a line type, a shape, a length, and a color of the stroke, respectively.

Figure 8:
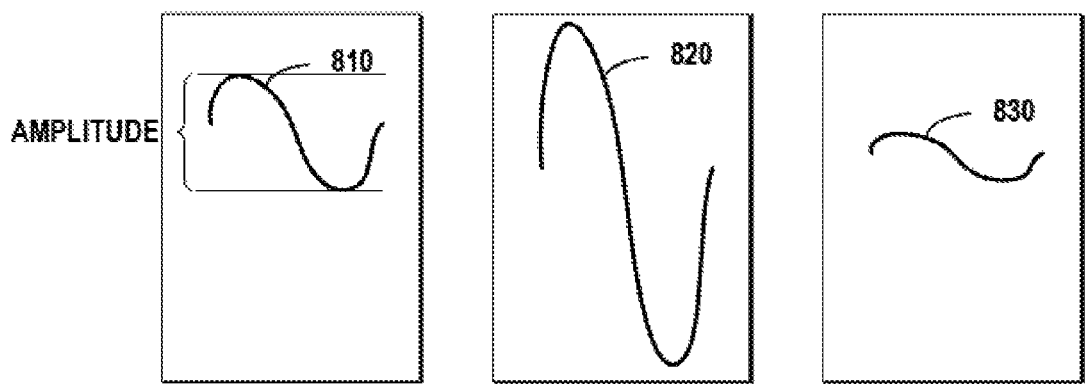

In FIG. 8, three graphic patterns 810, 820, and 830 are depicted, where each of these graphic patterns 810, 820, and 830 includes one stroke with a corresponding amplitude. Here, the amplitude of the stroke may refer to a vertical distance of the stroke, and various methods may be utilized for measuring the amplitude. Table 4 shows an example association model 420, which specifies that the amplitude of the stroke may be associated with the sound range of the music. Implementations relating to Table 4 are similar to those of the above tables, and details will be omitted.

TABLE 4

Example Association Model

| No. | Attribute | Feature | Objects |
|---|---|---|---|
| 1 | Amplitude: [0, 40] | Sound range: Small | Objects 1, 4, 6 . . . |
| 2 | Amplitude: (40, 70] | Sound range: Medium | Objects 101, 104, 106 . . . |
| 3 | Amplitude: (70, 100] | Sound range: Large | Objects 201, 204, 206 . . . |

Figure 9:
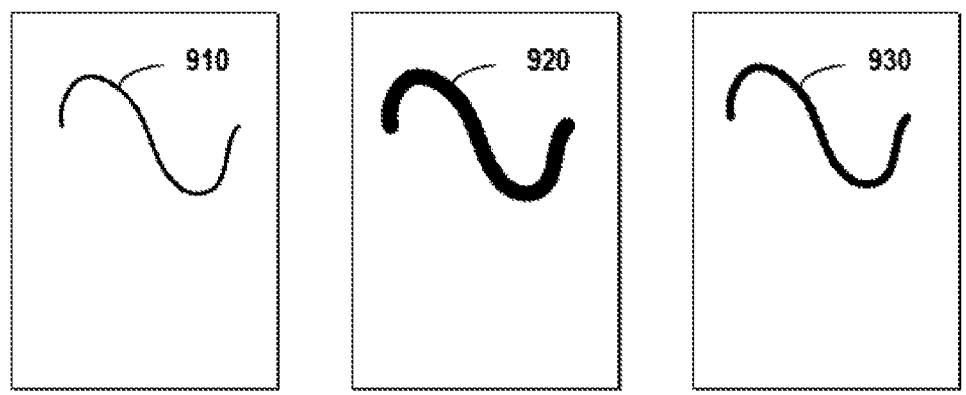

Hereinafter, reference will be made to FIG. 9, which depicts respective example graphic patterns that include respective strokes with different thickness according to one implementation of the present disclosure. Three graphic patterns 910, 920, and 930 are depicted in FIG. 9, where each of these graphic patterns 910, 920, and 930 includes one stroke with a corresponding thickness. Here, the thickness may refer to a thickness of the stroke, and various methods may be utilized for measuring the thickness. Table 5 shows an example association model 420, which specifies that the thickness of the stroke may be associated with the loudness of the background music. Implementations relating to Table 5 are similar to those of the above tables, and details will be omitted.

TABLE 5

Example Association Model

| No. | Attribute | Feature | Objects |
|---|---|---|---|
| 1 | Thickness: [0, 40] | Loudness: Weak | Objects 1, 2, 6 . . . |
| 2 | Thickness: (40, 70] | Loudness: Medium | Objects 101, 102, 106 . . . |
| 3 | Thickness: (70, 100] | Loudness: Strong | Objects 201, 202, 206 . . . |

Figure 10:
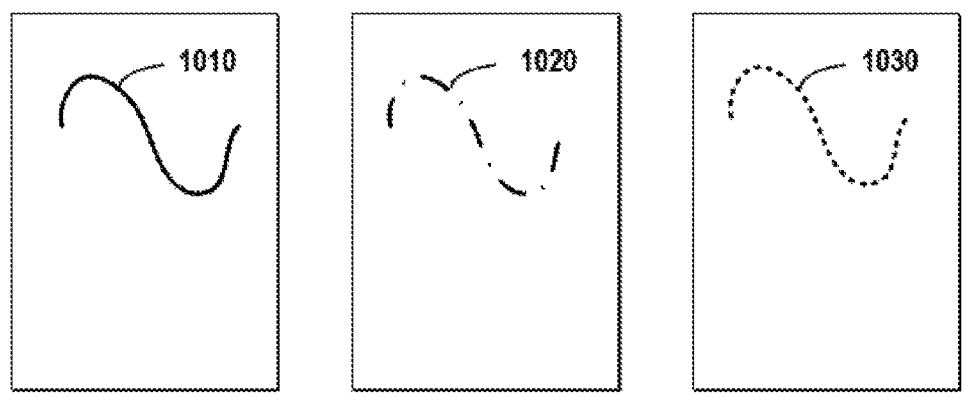

Hereinafter, reference will be made to FIG. 10, which depicts respective example graphic patterns that include respective strokes with different line type according to one implementation of the present disclosure. Three graphic patterns 1010, 1020, and 1030 are depicted in FIG. 10, where each of these graphic patterns 1010, 1020, and 1030 includes one stroke with a corresponding line type. Here, the line type may include several predefined types of line such as solid line, dotted line, dash and dot line, and the like. Each of these line types may be labelled with a unique indicator such as an integer number of 1, 2, 3, . . . . At this point, "1" may indicate a solid line type, "2" may indicate a dotted line type, and "3" may indicate a dash and dot line type. Table 6 shows an example association model 420, which specifies that the line type of the stroke may be associated with the classification of the object. Implementations relating to Table 6 are similar to those of the above tables, and details will be omitted.

TABLE 6

Example Association Model

| No. | Attribute | Feature | Objects |
|---|---|---|---|
| 1 | Line Type: 1 | Classification: Pop | Objects 1, 5, 6 . . . |
| 2 | Line Type: 2 | Classification: Jazz | Objects 101, 105, 106 . . . |
| 3 | Line Type: 3 | Classification: Rock and Roll | Objects 201, 205, 206 . . . |
| 4 | . . . | . . . | . . . |

Figure 11:
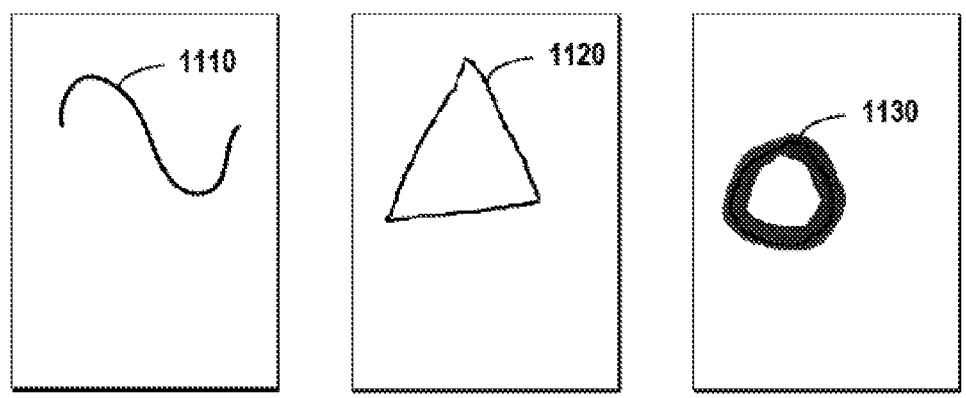

Hereinafter, reference will be made to FIG. 11, which depicts respective example graphic patterns that include respective strokes of respective shapes according to one implementation of the present disclosure. Three graphic patterns 1110, 1120, and 1130 are depicted in FIG. 11, where each of these graphic patterns 1110, 1120, and 1130 includes one stroke of a corresponding shape. Table 7 shows an example association model 420, which specifies that the shape of the stroke may be associated with the language of the object. Implementations relating to Table 7 are similar to those of the above tables, and details will be omitted.

TABLE 7

Example Association Model

| No. | Attribute | Feature | Objects |
|---|---|---|---|
| 1 | Shape: Wave | Language: Chinese | Objects 1, 5, 7 . . . |
| 2 | Shape: Triangle | Language: English | Objects 101, 105, 107 . . . |

TABLE 7-continued

Example Association Model

| No. | Attribute | Feature | Objects |
|---|---|---|---|
| 3 | Shape: Circle | Language: French | Objects 201, 205, 207 . . . |
| 4 | . . . | . . . | . . . |

Figure 12:
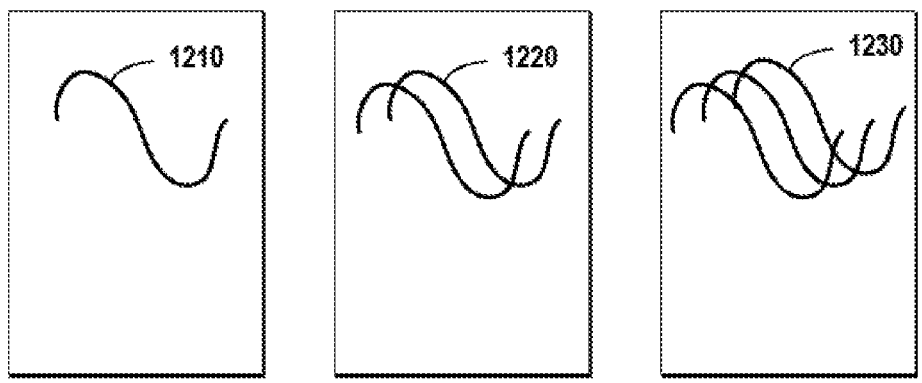

Hereinafter, reference will be made to FIG. 12, which depicts respective example graphic patterns that include one or more strokes according to one implementation of the present disclosure. Here, the number of the strokes may be associated with the number of singers of the object. At this point, the associated model 420 may be represented by Table 8 as below. Implementations relating to Table 8 are similar to those of the above tables, and details will be omitted.

TABLE 8

Example Association Model

| No. | Attribute | Feature | Objects |
|---|---|---|---|
| 1 | Number of strokes: 1 | Type: one singer | Objects 1, 5, 9 . . . |
| 2 | Number of strokes: 2 | Type: two singers | Objects 101, 105, 109 . . . |
| 3 | Number of strokes: 3 | Type: three singers | Objects 201, 205, 209 . . . |
| 4 | . . . | . . . | . . . |

In one implementation of the present disclosure, the color of the stroke may be associated with a gender of the singer of the object. At this point, the associated model 420 may be represented by Table 9 as below. Implementations relating to Table 9 are similar to those of the above tables, and details will be omitted.

TABLE 9

Example Association Model

| No. | Attribute | Feature | Objects |
|---|---|---|---|
| 1 | Color: Blue | Gender: Male | Objects 1, 5, 11 . . . |
| 2 | Color: Red | Gender: Female | Objects 101, 105, 111 . . . |

In one implementation of the present disclosure, the length of the stroke may be associated with a time duration of the object. Here, the length may refer to a total length of the stroke, and various methods may be adopted for measuring the length. For example, the length may be measured by the number of pixels along the curve of the stroke. Alternatively, the length may be measured by a percentage of the above pixel number to a predefined maximum length. An association model that associating the length with the time duration may be defined in a table similar to Table 2, and details will be omitted. In another implementation, the length of stroke may be associated with a feature selected from a group including a rhythm, a sound range, background music, a classification, a language, a duration, a gender of an artist of the target object, and a type of an artist of the target object.

Although each of above Tables illustrates the association model related to only one attribute, more than one attribute may be included in the association model according to another implementation of the present disclosure. For the purpose of description, an example association model including two attributes will be provided hereinafter. In this implementation, both of the width and the position of the stroke may be considered in defining the association model as shown in Table 10.

TABLE 10

Example Association Model

| No. | Attribute | Feature | Objects |
|---|---|---|---|
| 1 | Width: [0, 40] | Rhythm: Fast | Objects 1, 2, 3, 4, 5, 6 . . . |
| 2 | Width: (40, 70] | Rhythm: Medium | Objects 101, 102, 103 . . . |
| 3 | Width: (70, 100] | Rhythm: Low | Objects 201, 202, 203 . . . |
| 4 | Position: [0, 40] | Pitch: Low | Objects 2, 4, 6, 8, 10, 12 . . . |
| 5 | Position: (40, 70] | Pitch: Medium | Objects 102, 104, 106 . . . |
| 6 | Position: (70, 100] | Pitch: High | Objects 202, 204, 206 . . . |

Based on Table 10, both the width and the position may be extracted from the stroke of the inputted graphic pattern. When the extracted width belongs to "Width: [0, 40]" and the extracted position belongs to Position: [0, 40], an intersection of "Objects 1, 2, 3, 4, 5, 6 . . . (obtained from the width: [0, 40])" and "Objects 2, 4, 6, 8, 10, 12 . . . (obtained from the position: [0, 40])" may be determined as "Objects 2, 4, 6, . . . ." Here, the "Objects 2, 4, 6, . . . " in the intersection are the target objects that meet both of the search conditions "Rhythm: Fast" and "Pitch: Low." It is to be understood that Table 4 shows an example association model including only two attributes, more or less attributes may be included in another association model.

Figure 13:
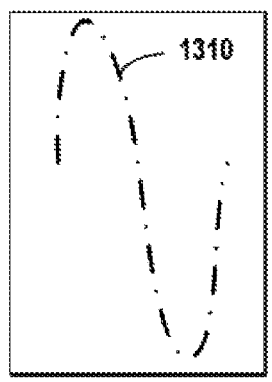

Further, a compressive example will be presented in FIG. 13 with reference to Table 11, which shows an example association model including a plurality of attributes (such as the width, the amplitude, the line type, and so on).

TABLE 11

Example Association Model

| No. | Attribute | Feature | Objects |
|---|---|---|---|
| 1 | Width: [0, 40] | Rhythm: Fast | Objects 1, 2, 3, 4, 5, 6 . . . |
| 2 | Width: (40, 70] | Rhythm: Medium | Objects 101, 102, 103 . . . |
| 3 | Width: (70, 100] | Rhythm: Slow | Objects 201, 202, 203 . . . |
| 4 | Amplitude: [0, 40] | Sound range: Small | Objects 1, 4, 6 . . . |
| 5 | Amplitude: (40, 70] | Sound range: Medium | Objects 101, 104, 106 . . . |
| 6 | Amplitude: (70, 100] | Sound range: Large | Objects 201, 204, 206 . . . |
| 7 | Line type: 1 | Classification: Pop | Objects 1, 5, 6 . . . |
| 8 | Line type: 2 | Classification: Jazz | Objects 101, 105, 106 . . . |
| 9 | Line type: 3 | Classification: Rock and Roll | Objects 201, 205, 206 . . . |
| . . . | . . . | . . . | . . . |

Referring to the stoke 1310 in FIG. 13, the width of the stroke 1310 belongs to [70, 100], the amplitude of the stroke 1310 belongs to [70,100], and the line type of the stroke 1310 is indicated by "3" (dash and dot). Accordingly, the search conditions may include: (1) Rhythm: Slow; (2) Sound range: Large; (3) Classification: Rock and Roll. Based on the above Table 10, target objects that meets the above search conditions (1)-(3) may be:
Group 1: Objects 201, 202, 203 . . .
Group 2: Objects 201, 204, 206 . . .
Group 3: Objects 201, 205, 206 . . .

At this point, an intersection of the above Groups 1 to 3 may be determined as the final result: Objects 201, . . . . Then, the final result may be return to the user. In one implementation of the present disclosure, if the intersection of Groups determined from all the search conditions extracted from the graphic pattern 410 includes no object, then a notification may be returned to the user, indicating that there is no qualified music in the repository 430.

Figure 14:
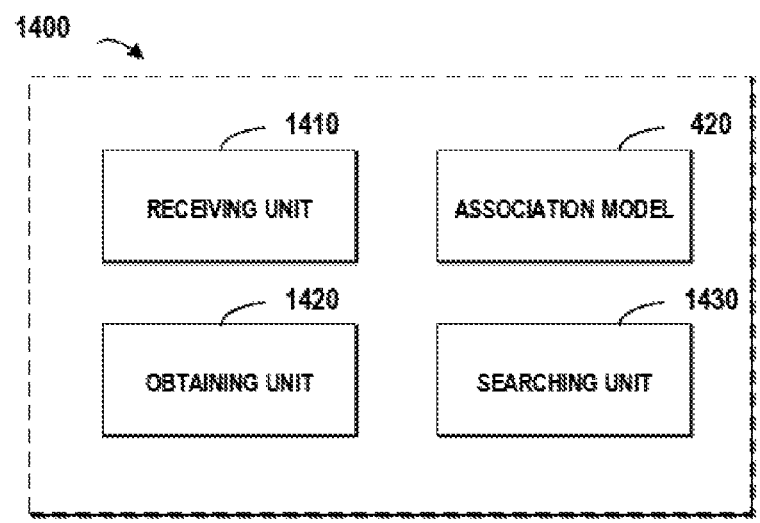
FIG. 14 depicts an example system for searching for at least one target object in a repository based on a request indicated by a graphic pattern, according to an embodiment of the present invention.

FIG. 14 depicts an example system for searching for a target object in a repository based on a request indicated by a graphic pattern according to one implementation of the present disclosure. In the system 1400, a receiving unit 1410 may be provided for receiving a graphic pattern indicating a request for searching in a repository for at least one target object. An obtaining unit 1420 may be provided for obtaining a search condition from the received graphic pattern by a graphical analysis. An association model 420 may be provided for indicating associations between search conditions and features of objects in the repository. Further, a searching unit 1430 may be provided for searching, based on an association model, for the at least one target object according to the obtained search condition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
   receiving, via a touch sensitive screen, a graphic pattern indicating a request for searching in a repository for at least one target object, wherein the graphic pattern includes at least one stroke having a curve;
   obtaining a search condition from the graphic pattern by a graphical analysis;
   extracting a plurality of one or more attributes of the at least one stroke in the graphic pattern by the graphic analysis, wherein the at least one or more attributes of the at least one stroke in the graphic analysis comprises a length of the graphic pattern, and wherein the length of the graphic pattern is measured by a number of pixels along the curve of the at least one stroke;
   determining the search condition based on the plurality of one or more attributes; and
   searching a plurality of target objects having a plurality of features for at least one target object from the target objects according to the search condition based on an association model, wherein the plurality of features comprise a time duration, and wherein the association model indicates one or more associations between the plurality of one or more attributes and the plurality of features of the target objects and comprises an association between the length of the graphic pattern and the time duration of the at least one target object.

2. The computer-implemented method of claim 1, wherein the plurality of one or more attributes extracted from the at least one stroke in the graphic pattern is further selected from a group consisting of:
   a width, a position, an amplitude, a thickness, a line type, a shape, a color, and a number.

3. The computer-implemented method of claim 1, wherein searching for the at least one target object comprises:

retrieving the at least one target object by querying the association model with the plurality of one or more attributes of the at least one stroke in the graphic pattern.

4. The computer-implemented method of claim 3, wherein retrieving the at least one target object comprises:
   determining the one or more objects from the association model in response to the plurality of features of the one or more objects being associated with at least one respective feature of the plurality of the one or more attributes of the at least one stroke in the graphic pattern; and
   returning the one or more objects as the at least one target object.

5. The computer-implemented method of claim 2, wherein the plurality of features of the one or more objects in the repository further include at least one of: a rhythm, a pitch, a sound range, background music, a classification, a language, a duration, a gender of an artist, and a type of an artist.

6. The computer-implemented method of claim 5, wherein determining the one or more objects comprises:
   selecting the one or more objects in response to at least one of:
      a rhythm of the one or more objects being associated with a width included in the at least one attribute;
      a pitch of the one or more objects being associated with a position included in the at least one attribute;
      a sound range of the one or more objects being associated with an amplitude included in the at least one attribute;
      background music of the one or more objects being associated with a thickness included in the at least one attribute;
      a classification of the one or more objects being associated with a line type included in the at least one attribute;
      a language of the one or more objects being associated with a shape included in the at least one attribute;
      a gender of an artist of the one or more objects being associated with a color included in the at least one attribute; and
      a type of an artist of the one or more objects being associated with a number included in the at least one attribute.

7. The computer-implemented method of claim 1, wherein the graphic pattern includes at least one stroke of at least one of: a wave shape, a line, a triangle, a rectangle, a square, a circle, and a random shape.

8. A computer-implemented system, comprising a computer processor coupled to a computer-readable memory unit, the computer-readable memory unit comprising instructions that when executed by the computer processor implements a method comprising:
   receiving, via a touch sensitive screen, a graphic pattern indicating a request for searching in a repository for at least one target object, wherein the graphic pattern includes at least one stroke having a curve;
   obtaining a search condition from the graphic pattern by a graphical analysis;
   extracting a plurality of one or more attributes of the at least one stroke in the graphic pattern by the graphic analysis, wherein the at least one or more attributes of the at least one stroke in the graphic analysis comprises a length of the graphic pattern, and wherein the length of the graphic pattern is measured by a number of pixels along the curve of the at least one stroke;
   determining the search condition based on the plurality of one or more attributes; and
   searching a plurality of target objects having a plurality of features for at least one target object from the target objects according to the search condition based on an association model, wherein the plurality of features comprise a time duration, and wherein the association model indicates one or more associations between the plurality of one or more attributes and the plurality of features of the target objects and comprises an association between the length of the graphic pattern and the time duration of the at least one target object.

9. The computer-implemented system of claim 8, wherein the plurality of one or more attributes extracted from the at least one stroke in the graphic pattern is further selected from a group consisting of:
   a width, a position, an amplitude, a thickness, a line type, a shape, a color, and a number.

10. The computer-implemented system of claim 8, wherein searching for the at least one target object comprises:
    retrieving the at least one target object by querying the association model with the plurality of one or more attributes of the at least one stroke in the graphic pattern.

11. The computer-implemented system of claim 10, wherein retrieving the at least one target object comprises:
    determining the one or more objects from the association model in response to the plurality of features of the one or more objects being associated with at least one respective feature of the plurality of the one or more attributes of the at least one stroke in the graphic pattern; and
    returning the one or more objects as the at least one target object.

12. The computer-implemented system of claim 9, wherein the plurality of features of the one or more objects in the repository further include at least one of: a rhythm, a pitch, a sound range, background music, a classification, a language, a gender of an artist, and a type of an artist.

13. The computer-implemented system of claim 12, wherein determining the one or more objects comprises:
    selecting the one or more objects in response to at least one of:
       a rhythm of the one or more objects being associated with a width included in the at least one attribute;
       a pitch of the one or more objects being associated with a position included in the at least one attribute;
       a sound range of the one or more objects being associated with an amplitude included in the at least one attribute;
       background music of the one or more objects being associated with a thickness included in the at least one attribute;
       a classification of the one or more objects being associated with a line type included in the at least one attribute;
       a language of the one or more objects being associated with a shape included in the at least one attribute;
       a gender of an artist of the one or more objects being associated with a color included in the at least one attribute; and
       a type of an artist of the one or more objects being associated with a number included in the at least one attribute.

14. The computer-implemented system of claim 8, wherein the graphic pattern includes at least one stroke of at least one of: a wave shape, a line, a triangle, a rectangle, a square, a circle, and a random shape.

15. A computer program product, the computer program product comprising a computer readable storage medium having program instructions embodied therewith, the program instructions executable by an electronic device to cause the electronic device to perform actions of:
- receiving, via a touch sensitive screen, a graphic pattern indicating a request for searching in a repository for at least one target object, wherein the graphic pattern includes at least one stroke having a curve;
- obtaining a search condition from the graphic pattern by a graphical analysis;
- extracting a plurality of one or more attributes of the at least one stroke in the graphic pattern by the graphic analysis, wherein the at least one or more attributes of the at least one stroke in the graphic analysis comprises a length of the graphic pattern, and wherein the length of the graphic pattern is measured by a number of pixels along the curve of the at least one stroke;
- determining the search condition based on the plurality of one or more attributes; and
- searching a plurality of target objects having a plurality of features for at least one target object from the target objects according to the search condition based on an association model, wherein the plurality of features comprise a time duration, and wherein the association model indicates one or more associations between the plurality of one or more attributes and the plurality of features of the target objects and comprises an association between the length of the graphic pattern and the time duration of the at least one target object.

16. The computer program product of claim 15, wherein the plurality of one or more attributes extracted from the at least one stroke in the graphic pattern is further selected from a group consisting of:
- a width, a position, an amplitude, a thickness, a line type, a shape, a color, and a number.

17. The computer program product of claim 15, wherein searching for the at least one target object comprises:
- retrieving the at least one target object by querying the association model with the plurality of one or more attributes of the at least one stroke in the graphic pattern.

* * * * *